H. E. MOORE.
HAY AND STRAW HOOK.
APPLICATION FILED DEC. 22, 1917.
1,289,228.
Patented Dec. 31, 1918.
2 SHEETS—SHEET 1.
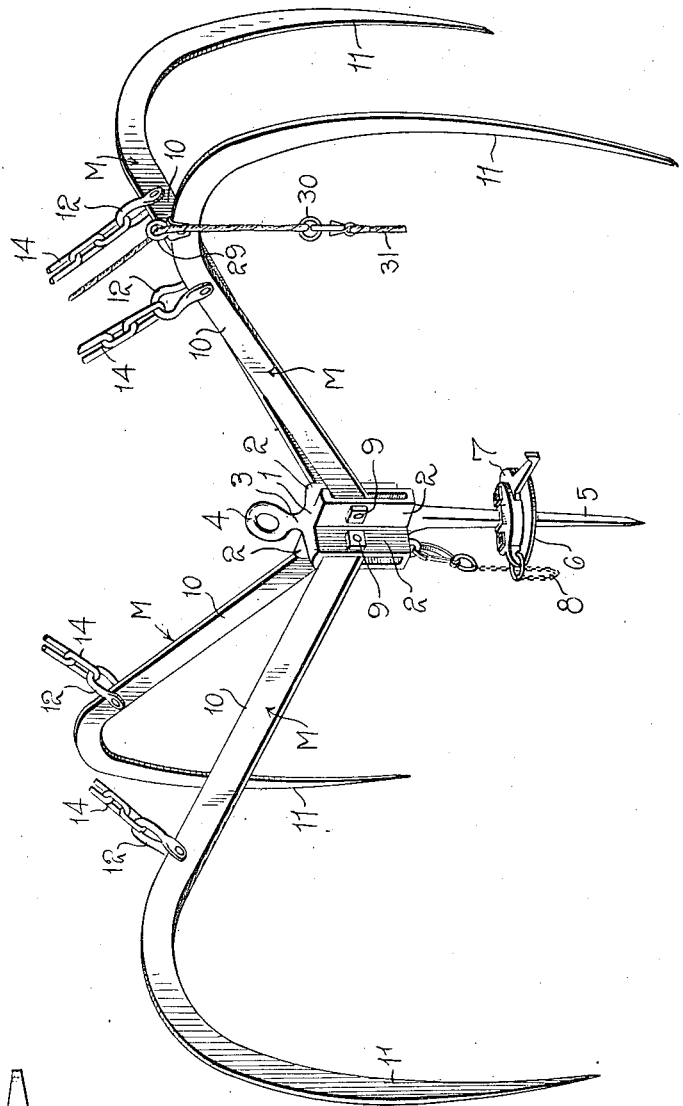
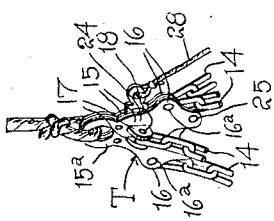
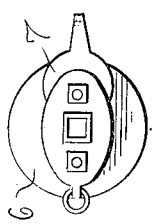
Inventor
H. E. MOORE
By Watson E. Coleman
Attorney

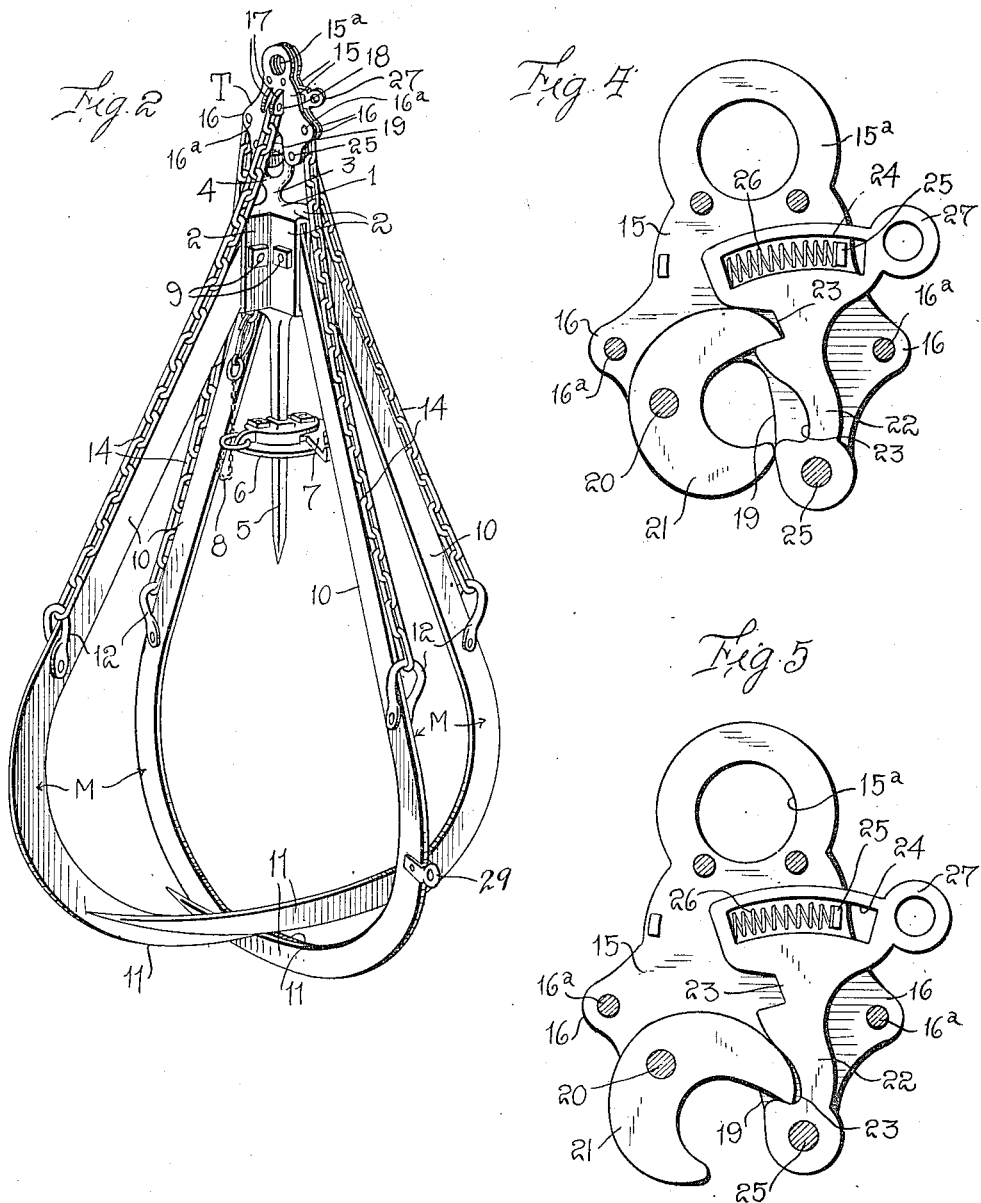

UNITED STATES PATENT OFFICE.

HARRY E. MOORE, OF SMITHFIELD, NEBRASKA.

HAY AND STRAW HOOK.

1,289,228.  Specification of Letters Patent.  Patented Dec. 31, 1918.

Application filed December 22, 1917.  Serial No. 208,413.

*To all whom it may concern:*

Be it known that I, HARRY E. MOORE, a citizen of the United States, residing at Smithfield, in the county of Gosper and State of Nebraska, have invented certain new and useful Improvements in Hay and Straw Hooks, of which the following is a specification, reference being had to the accompanying drawings.

This invention relates to certain improvements in hay and straw hooks and it is an object of the invention to provide a novel and improved device of this general character including a plurality of hook members, preferably four in number, which move in substantially perpendicularly related planes whereby compression is imposed upon the load toward a common center.

It is also an object of the invention to provide a device of this general character having novel and improved means whereby each of the hook members comprised therein is capable of swinging or pivotal movement independently of the other hook members so that the device as a whole may automatically adjust itself to compensate for any uneven surfaces of the load.

Furthermore the invention has for an object to provide a novel and improved device of this general character including a plurality of coacting hook members together with an elongated center spike or spear to precede the hook members into the hay or straw and guide said hook members in their grasp together with a plate adjustably mounted upon said spike or spear which serves to limit the penetration of the spike or spear to prevent overloading or to prevent injury to a floor or wagon when removing small quantities of hay or straw therefrom.

A still further object of the invention is to provide a novel and improved device of this general character comprising a plurality of relatively movable hook members together with a trip block coacting therewith and wherein a releasing member for the trip block is engaged with one of the hook members to prevent the device as a whole from revolving and to enable the operator to properly guide the device.

A still further object of the invention is to provide a novel and improved device of this general character having a trip block including releasable means engageable with a head or casting with which the hook members are operatively connected so that the load grasped by the hook members may be readily elevated and released at the desired time.

The invention consists in the details of construction and in the combination and arrangement of the several parts of my improved hay and straw hook whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective of a device constructed in accordance with an embodiment of my invention with the hook members in extended or release position;

Fig. 2 is a view in perspective of the device as herein embodied, and in closed or compacted arrangement;

Fig. 3 is a view in top plan of the plate or member adjustably mounted upon the spike or spear as herein included;

Fig. 4 is an enlarged view partly in elevation and partly in section of the trip block as herein employed with the trigger or catch in closed position, and Fig. 5 is a view similar to Fig. 4 with the trigger or catch in open position.

As disclosed in the accompanying drawings 1 denotes a head or casting provided with four equi-distantly spaced and radially disposed hollow wings 2 and provided at its top with the upstanding post or arm 3 having its upper or free extremity provided with the eye 4. Depending from the lower end of the head or casting 1 at the axial center thereof is the spike or spear 5 of predetermined length. Slidably mounted upon the spike or spear 5 is the gage plate 6 having operatively engaged with the upper surface thereof a clamping member or cam 7 adapted to coact with the spike or spear 5 to hold the plate 6 at a predetermined point longitudinally of the spike or spear 5. The plate 6 has also secured thereto a flexible member 8 herein disclosed as a chain and which member 8 is engaged with the lower end of the head or casting 1 so that loss of the plate 6 is prevented.

Extending within each of the wings 2 through the outer and open end thereof is an end portion of a hook member M and which end portion is pivotally engaged with the wing 1 as indicated at 9. The hook member M is of predetermined dimensions and includes the substantially straight shank 10 terminating in the inwardly curved portion 11. Each of the hook members M has swinging movement in a plane radial of the head or casting 1 and as the wings 2 are four in number and equi-distantly spaced it will be at once noted that the adjacent hook members are perpendicularly related. It is also to be noted that in view of the fact that the hook members M move in planes radiating from the head or casting 1 the compression of said hook members upon a load will be toward a common center. It is also to be particularly noted that each of the hook members M is capable of movement independently of the remainder of the hook members; and which permits the device to radially adjust itself to the uneven surfaces of the hay or straw with which the device is employed.

Each of the hook members M adjacent the outer end portion of its shank 10 or at the balancing point thereof has engaged therewith a clevis 12. Secured to the clevis 12 is a flexible member 14 herein disclosed as a linked chain. The opposite end portion of the member 14 is engaged with the trip block T in a manner which will hereinafter be more particularly referred to.

The trip or block T comprises two plates 15 of duplicate formation and in predetermined spaced relation. Adjacent ends of the plates are provided with the eye 15ª to afford means whereby the hoisting mechanism may be engaged therewith. Opposite sides of the plate adjacent the lower ends thereof are provided with the outstanding ears 16 supporting the pins 16ª and with which the upper extremities of certain of the flexible members 14 are engaged. Each of the plates 15 is provided with a pair of outstanding ears 17 supporting a pin 18 and with which the inner ends of the remaining flexible members 14 are secured. The lower ends of the plates are each provided with a vertically disposed open slot 19 in transverse alinement and which afford a jaw to receive the eye 4. Positioned between the plates 15 and pivotally engaged as at 20 intermediate its length is the trigger or catch 21 substantially crescent shape in form and one end portion of which passes through the eye 4 when arranged within the jaw in the trip block so that the hook members M may be raised with the trip block. Pivotally engaged at its lower end with the plates 15 and adjacent the opposite side of the jaw in the trip block and in close proximity to the lower end of the plates is the upstanding arm 22 having its inner marginal portion provided with the longitudinally spaced recesses 23 arranged on such an angle to receive the inner end portion of the trip or catch 21 so that said trip or catch may be locked in closed position as illustrated in Fig. 4 or held in open position as indicated in Fig. 5. The upper end portion of the arm 22 is enlarged transversely and provided with an arcuate slot 24 concentric to the pivotal mounting 25 of the arm 22. The arm 22 is positioned between the plates 15 and one of said plates 15 is provided with an inwardly directed lug 25 extending within the slot 24. Interposed between the lug 25 and the inner end of the slot 24 is an expansible member 26 herein disclosed as a conventional coiled spring, and the expansible member 26 operates to constantly urge the arm 22 inwardly whereby the proper coaction of the arm 22 with the trip or catch 21 is assured.

The outer portion of the arm 22 at its top is provided with an eye 27 to afford means whereby a flexible member 28 may be engaged with said arm. As herein disclosed the member 28 is a cable or rope of requisite gage. The member 28 is also directed through an upstanding eye member 29 pivotally engaged with one of the hook members M adjacent the outer extremity of the shank 10. The outer end portion of the flexible member 28 is provided with an eye 30 to afford detachable connection for a second flexible member or cable 31 which is adapted to be grasped by the operator. By having the flexible member 28 passing through the eye member 29 it will be at once noted that the head or casting 1 together with the hook members M will be prevented from rotating which would otherwise have a tendency to interfere with the successful operation of the device. By this arrangement it is also possible for the operator to properly guide or direct the hook members M in accordance with the occasions of practice.

The operation of my invention is believed to be clearly apparent to those skilled in the art to which it relates.

The hook members M are engaged with the hay or straw to be lifted in a conventional manner and the trip block T through the medium of the trigger or catch 21 is engaged with the eye 4. When the load held by the hook members M has been carried to the proper point it is only necessary to impart requisite pull upon the flexible member 28 which will result in the release of the trigger or catch 21 and the desired drop of the load. As the eye 4 passes from the trigger or catch 21 the inner end portion of said trigger or catch will seat within the lower recess 23 in the arm 22 whereby the trigger or catch 21 is held in open or release position. It will also be self-evident that the spike or spear 5 will serve to guide the device when being engaged with the hay or straw to be lifted and that the extent of penetration of said spike or spear 5 will be controlled by the plate 6, so that a floor or wagon will be protected against injury or whereby overloading of the hook members will be prevented when the device is employed in connection with heavy hay.

From the foregoing description, it is thought to be obvious that a hay and straw fork constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carying out my invention in practice except as hereinafter claimed.

I claim:

1. A device of the character described comprising a head, hook members pivotally engaged with the head and capable of movement one independently of the other, a trip block having releasable connection with the head, flexible connections between the hook members and the trip block, a spear extending longitudinally from the head at the inner end thereof, and adjustable means carried by the spear for limiting the penetration thereof.

2. A device of the character described comprising a head, hook members pivotally engaged with the head and capable of movement one independently of the other, a trip block having releasable connection with the head, flexible connections between the hook members and the trip block, a spear extending longitudinally from the head at the inner end thereof, and a plate carried by the spear and adjustable longitudinally thereof.

3. A device of the character described comprising a head, hook members pivotally engaged with the head and capable of movement one independently of the other, a trip block having releasable connection with the head, flexible connections between the hook members and the trip block, a spear extending longitudinally from the head at the inner end thereof, a plate slidably engaged with the spear and movable longitudinally thereof, and means carried by the plate for clamping the same against movement.

4. A device of the character described comprising a head, hook members carried thereby, a spear extending longitudinally from the head at the inner end thereof, and adjustable means carried by the spear for limiting the penetration thereof.

5. A device of the character described comprising a head, a plurality of hook members separately engaged with the head and capable of movement one independently of the other to compensate for any uneven surfaces of the load, a spear extending longitudinally from the head at the inner end thereof, and adjustable means carried by the spear for limiting the penetration thereof.

6. A device of the character described comprising a head, a plurality of hook members separately engaged with the head and capable of movement one independently of the other to compensate for any uneven surfaces of the load, a spear extending longitudinally from the head at the inner end thereof, and a plate carried by the spear and adjustable longitudinally thereof.

7. A device of the character described comprising a head, a plurality of hook members separately engaged with the head and capable of movement one independently of the other to compensate for any uneven surfaces of the load, a spear extending longitudinally from the head at the inner end thereof, a plate slidably engaged with the spear and movable longitudinally thereof, and means carried by the plate for clamping the same against movement.

In testimony whereof I hereunto affix my signature in the presence of two witnesses.

HARRY E. MOORE.

Witnesses:
L. H. HANLIN,
E. T. BIGELOW.

Copies of this patent may be obtained for five cents each, by addressing the "Commissioner of Patents, Washington, D. C."